Figure 1:
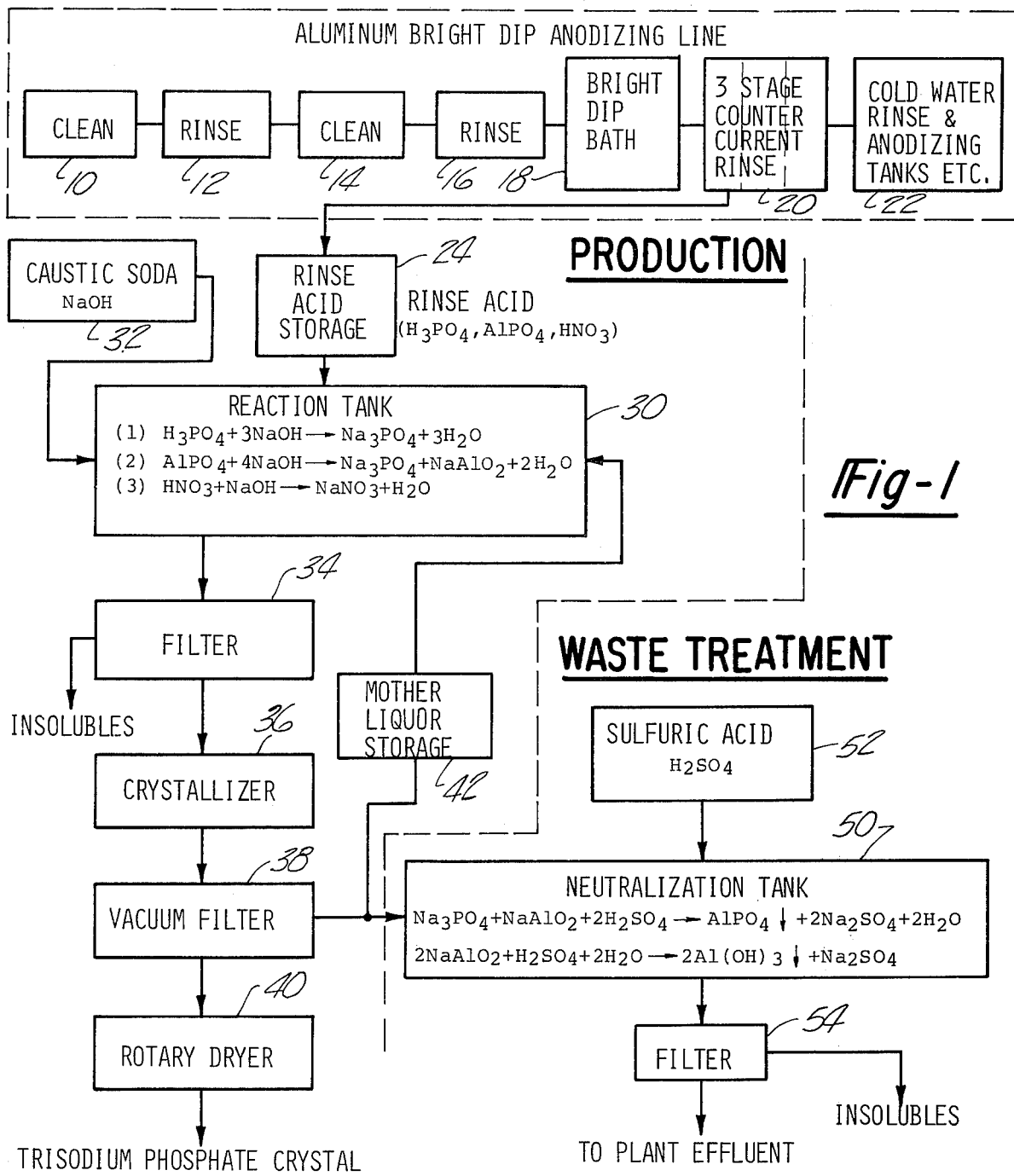

United States Patent [19]

Fang

[11] 4,044,106
[45] Aug. 23, 1977

[54] RECLAMATION OF PHOSPHATE FROM BRIGHT DIP DRAG-OUT

[76] Inventor: Albert Yi-Hung Fang, 8542 Wildwood Ave., Westland, Mich. 48185

[21] Appl. No.: 622,472

[22] Filed: Oct. 15, 1975

[51] Int. Cl.$^2$ .................. C01B 15/16; B08B 7/04
[52] U.S. Cl. .................. 423/312; 423/308; 134/13; 156/642; 423/305
[58] Field of Search ............ 423/308, 311, 312, 305, 423/307; 134/10, 13; 156/642

[56] References Cited

U.S. PATENT DOCUMENTS

| 1,676,556 | 7/1928 | Howard | 423/308 |
| 1,897,705 | 2/1933 | Mandlen et al. | 423/308 |
| 2,050,249 | 8/1936 | Adler | 423/312 |

OTHER PUBLICATIONS

"Quality and Cost Improvement in the Aluminum Bright Anodizing Process," Nelson et al., Plating, Jan. 1966, p. 72–77.

"Spent Phosphoric Acid: To Recover or Not to Recover" Monsanto Bright Dip, vol. 2, Issue 2.

*Primary Examiner*—O. R. Vertiz
*Assistant Examiner*—Gregory A. Heller
*Attorney, Agent, or Firm*—Harness, Dickey & Pierce

[57] ABSTRACT

Rinse acid collected from an aluminum bright dipping operation is reacted with soda alkalies at 80° C or higher to yield a solution of trisodium phosphate, $Na_3PO_4$, sodium aluminate, $NaAlO_2$, sodium nitrate, $NaNO_3$, and trace insolubles. The hot solution is quickly filtered to remove all insoluble impurities and then cooled so that the trisodium phosphate crystallizes out which, after filtering, leaves a mother liquor containing some remaining trisodium phosphate and soluble impurities, namely, sodium aluminate and sodium nitrate. The mother liquor is then recycled repeatedly with further batches of rinse acid to maximize the phosphate recovery.

12 Claims, 2 Drawing Figures

RECLAMATION OF PHOSPHATE FROM BRIGHT DIP DRAG-OUT

This invention relates to a method for the reclamation of a valuable chemical from spent phosphoric acid containing aluminum as a major impurity and, more particularly, to such reclamation from finishing operations of aluminum and its alloys.

Bright dipping is a commonly used process in industry for chemical polishing of aluminum, and commercial bright dip operations utilize a solution mainly based on phosphoric acid. In the bright dip process, cleaned aluminum parts are immersed for a few minutes in an accurately proportioned hot aqueous solution of phosphoric acid, aluminum phosphate and nitric acid. This hot solution attacks aluminum vigorously with the release of nitrogen and nitrogen oxides and produces a bright, highly reflective finish. For high quality work at minimum chemical cost, bright dip baths are normally operated in the following range:

| | |
|---|---|
| Phosphoric acid, $H_3PO_4$ | 64–70% (wt) |
| Aluminum phosphate, $AlPO_4$ | 10–14% |
| Nitric acid, $HNO_3$ | 2.8–3.2% |
| Water, $H_2O$ | 17–23% |
| Copper, Cu | 0.01–0.02% |

Other brightening baths based principally on phosphoric and nitric acids are also used.

In bright dipping operations, control of bath composition is critical. Variance of concentration of any component outside an acceptable range will directly affect the quality of work. With a bright dip bath, the bath constituents adhere to the parts being polished and are constantly being transferred to the subsequent rinse tank. This process is commonly referred to as "drag-out". Hence by normal drag-out and frequent addition of fresh acids, the aluminum concentration in the bright dip bath is controlled at equilibrium so that the aluminum dissolved from the parts being polished is balanced by the aluminum dragged out of the bath. While this ensures that the bath can be worked continuously, it is a wasteful procedure. In practice, this means that only 10–15% of the purchased phosphoric acid added to the bright dip bath is actually consumed in chemically polishing the surface. The remainder is lost to the subsequent rinses.

In addition to being an expensive operation, commercial bright dip lines also create a serious problem in the handling and disposal of the waste liquor because phosphate is one of the more objectionable materials from the standpoint of stream pollution. Chemical destruction methods for the neutralization and treatment of the rinse acid have been developed, but none of these has achieved widespread acceptance because of the cumbersome equipment required and high initial cost thereof and the large quantities of treating chemicals consumed. However, one preliminary recovery technique widely used is that of countercurrent rinsing wherein sufficient rinse tanks are operated in such a way that water flow is countercurrent to the flow of parts to control the first rinse at acid concentrations in the range of 30–40%. Rinse acid over 30% $H_3PO_4$ is sold directly to liquid fertilizer manufacturers as a raw material, but the price is generally low and storage facilities are required due to the seasonal nature of the fertilizer business. A refinement of this recovery for the fertilizer industry is evaporative recovery, where the rinse acid is concentrated by evaporation to higher strength for resale, for example, 175% $H_3PO_4$. Although 75% acid requires less storage space and costs less to ship than 30% rinse acid, recovery of 75% acid requires additional capital and operating costs.

Various other techniques have been proposed to recover the rinse acid, but these systems have not been totally satisfactory, being either impractical in operation or economically infeasible. For example, a proposed process to recover the phosphoric acid for reuse is that of ion exchange wherein negatively charged resins carrying hydrogen ions separate the dissolved aluminum from the phosphoric acid which is then concentrated to the required strength for reuse in the bright dip bath. This system requires high capital investment due to the fact that rinse and evaporator systems are employed in addition to the ion exchange equipment. Aside from the high capital investment, another disadvantage is the need for sulfuric acid to regenerate the resins. The output sulfuric acid solution from the resin unit must then be neutralized before discharge. In other words, the plant still faces a waste disposal problem.

Another proposed recovery is by a sorption and desorption technique. The principle of the separation is called acid retardation. When a mixture of a strong acid and its salt is passed through a column of strong base anion exchange resin in the common ion form, the movement of the acid on the resin bed is retarded (i.e., slowed down) relative to the movement of the salt. This technique could theoretically be used to separate aluminum phosphate from the phosphoric acid in the rinse acid and the recovered phosphoric acid could then be concentrated by evaporation for reuse in the bright dip bath. Because of the insolubility of aluminum phosphate, $AlPO_4$, in water, free phosphoric acid is required to hold the aluminum phosphate in solution. This not only reduces the efficiency of the recovery but also increases waste disposal problems. The principal advantage of the acid retardation technique compared to the above described ion exchange method is that the acid can be desorbed from the resin by washing it with plain water. However, this system also requires high capital investment, has high operating and maintenance costs and has not received commercial acceptance.

For the foregoing reasons, it should be apparent that efficient and economical recovery of phosphoric acid from bright dip drag-out is economically desirable. Indeed it is fast becoming an absolute necessity.

In an entirely different vein but by way of further background, crystalline trisodium phosphate is one of the largest tonnage items of sodium phosphates manufactured in the United States. The product of commerce has the approximate formula of $Na_3PO_4 \cdot 12H_2O$ but varies from manufacturer to manufacturer by having more or less free alkalinity and somewhat less water than is indicated above. It has been verified that a dodecahydrate, $Na_3PO_4 \cdot 12H_2O$, cannot be crystallized from solution. The trisodium phosphate compounds containing more than $8H_2O$ are not simple hydrates but hydrate complexes which always contain the sodium salt of a monobasic acid or sodium hydroxide. The common form of commercial trisodium phosphate may be more correctly represented as $(Na_3PO_4 12H_2O)\frac{1}{4}$-NaOH.

Trisodium phosphate is conventionally produced by processing the reaction products of phosphoric acid and soda alkalies. Since the third atom of hydrogen in phosphoric acid cannot be replaced by the sodium in soda ash, the chemical reactions involved in the manufacture of trisodium phosphate must be carried out in two stages:

1. The production of disodium phosphate by the action of phosphoric acid on a solution of soda ash: $Na_2CO_3 + H_3PO_4 \rightarrow Na_2HPO_4 + CO_2 \uparrow + H_2O$
2. The production of trisodium phosphate by treating the solution of disodium phosphate with sodium hydroxide: $Na_2HPO_4 + NaOH \rightarrow Na_3PO_4 + H_2O$.

In commercial practice of the above process, iron and aluminum were considered costly impurities since, when precipitated at various stages of neutralization, they carry with them very appreciable quantities of phosphoric acid which is so combined that it cannot be recovered by leaching the precipitate with water.

Typical commercial trisodium phosphate manufacturing processes are carried out as follows: Sodium carbonate (soda ash) is introduced into a mixing tank, either as an aqueous solution or as a solution made with mother liquor. Sufficient strong phosphoric acid is added at the surface of the tank so that carbon dioxide may be liberated easily. The resulting disodium phosphate solution is pumped to a filter press to remove certain precipitated impurities (a small amount of white mud consisting of silica and iron and aluminum phosphates). The clear solution of disodium phosphate is then pumped into another mixing tank, and a sufficient quantity of a strong solution of caustic soda is added to produce a saturated solution of trisodium phosphate. This hot solution is filtered to remove any insolubles (white mud) and is passed into batch-type vacuum crystallizers. Crystals of trisodium phosphate ($Na_3PO_4.12H_2O$) form and are allowed to separate in a settler. The settled crystals of trisodium phosphate are separated from the remaining mother liquor on vacuum filters. The crystals are further dried in rotary dryers (below 70° C), screened and packaged. The clear solution from the settler and the mother liquor from the filter go back into one of the mixing tanks for reprocessing. The cycle is repeated until this liquor is too impure for use.

One of the more important objects of the present invention is to reduce the cost and waste in aluminum bright dipping and other aluminum finishing operations.

Further objects of the present invention are to provide a phosphate recovery method that efficiently recovers phosphates from bright dip drag-out in the rinse stages of a bright dip polishing line; that eliminates or at least substantially reduces the heretofore adverse economic consequences of drag-out from a bright dip bath and hence facilitates optimization of other variables in the bright dip line substantially independently of drag-out from the bath; that recovers phosphates from bright dip rinse acid in a form that is more valuable and in greater demand for a wider variety of uses as compared to phosphate heretofore recovered for fertilizers; that does not require sophisticated and expensive equipment; that achieves higher recovery efficiency than that of the aforementioned ion exchange or sorption and desorption methods; and/or that is easily adapted for recovery from a small-scale or a large-scale production facility; and that substantially reduces the cost of waste effluent treatment associated with bright dipping operations.

Still further objects of the present invention are to provide a method for producing trisodium phosphate at a cost that is less than, or at least competitive with, trisodium phosphates produced by present commercial processes; that is particularly useful and effective where the phosphoric acid used as a starting material contains aluminum as a major impurity; that is particularly suited for using rinse acid from an aluminum bright dip operation as a starting material.

Figure 2:
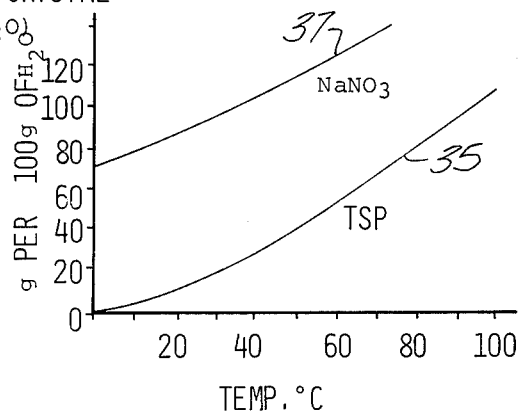

Other objects, features and advantages of the present invention will become apparent in connection with the following description, the appended claims and the accompanying drawings in which:

FIG. 1 is a flow diagram of an aluminum bright dip anodizing line together with the recovery techniques of the present invention to produce trisodium phosphate from the rinse acid in the line; and FIG. 2 is a solubility curve of trisodium phosphate and sodium nitrate useful in understanding one important aspect of the present invention.

Referring in greater detail to FIG. 1, in a typical commercial bright dip and anodizing line, aluminum parts are first cleaned in a hot mild alkali cleaner 10, rinsed in cold water as indicated at 12, cleaned in a hot acid cleaner 14 and then rinsed in one or more stages as indicated at 16 before being chemically polished in a bright dip bath 18. The constituents of the bright dip bath may be phosphoric acid, nitric acid and water together with dissolved aluminum (in the form of aluminum phosphate) and trace quantities of aluminum alloying constituents as well as other bath additives such as copper.

After chemical polishing in the bright dip bath 18, the parts are then transferred to a three-stage countercurrent rinse stage 20 and, after rinsing, into a typical anodizing tank and then to additional sealing, rinsing and drying operations as indicated generally at 22. As indicated earlier, there is a continual transfer from the bright dip bath 18 into the rinse 20 of the constituents in the bright dip bath, commonly referred to as drag-out; namely, a transfer of phosphoric acid, nitric acid, water and dissolved aluminum. In a typical three-stage countercurrent rinse, for example, the first stage is what is known as a dead rinse and is maintained at a maximum concentration of 35% phosphoric acid, with the second and third stages being maintained at 10% and 1% phosphoric acid, respectively. As the concentration exceeds 35% in the first stage, the rinse acid is removed and replaced by acid from the 10% concentration rinse acid in the second stage, which in turn is replaced by the 1% concentration rinse acid in the third stage. Although typically the first stage in the three-stage rinse 20 in maintained at a maximum of say 35% concentration of phosphoric acid, the rinse can go to about a 40% phosphoric acid content without any substantial adverse effect on the aluminum part, provided that the rinse is maintained at a sufficiently low temperature and the part is not subjected to the high concentration rinse for an excessively long period of time. In some bright dip lines, the rinse acid is controlled at concentrations as low as approximately 30% phosphoric acid. It is noted that lower rinse acid concentrations reduce the loss to subsequent rinses. Hence the rinses are generally operated in the range of 30–40% concentration and, preferably, at say about 35% concentration.

According to the present invention, after considering and rejecting a number of other recovery possibilities, I have discovered that this type of rinse acid, generally in the range of from 30–40% concentration (preferably at about 35% concentration, but commercially practical down to about 10% concentration), can be easily converted into trisodium phosphate; and the trisodium phosphate can be readily and effectively separated from the solution even though the rinse acid has a high aluminum content which heretofore has been considered a most costly impurity to remove. Hence according to one aspect of the present invention, the rinse acid is periodically removed from rinse 20 and transferred to storage at 24 for subsequent transfer to a reaction tank 30 where it is alkalized by the addition of caustic soda (NaOH) indicated at 32 to produce trisodium phosphate, sodium aluminate and sodium nitrate as shown by the reactions indicated on the drawings. During the reaction, aluminum could be precipitated in the pH ranges from 3 to 10, but a large quantity of valuable phosphate would be lost with the precipitated aluminum as aluminum phosphate. According to the present invention, the pH at tank 30 is above 13 and the aluminum is totally converted into soluble sodium aluminate, $NaAlO_2$, by reaction with sufficient sodium hydroxide. Depending on the concentration of the rinse acid used and the amount of recycled mother liquor, as will be described hereinafter it may be necessary to add more or less water with the caustic soda.

The reaction between the rinse acid and caustic soda is exothermic so that the alkalized reaction is at a temperature substantially above the room temperature. The hot alkalized solution from the reaction tank 30 is then filtered as indicated at 34 to remove insolubles such as heavy metal hydroxides including hydroxides formed from alloying elements in the aluminum being processed. The filtered alkalized solution is then processed at a low temperature crystallizer 36. It is important that the alkalized solution be filtered while hot so that the trisodium phosphate stays in solution, permitting insoluble impurities to be removed without removing trisodium phosphate. This results in a purer trisodium phosphate end product. It should be noted that the exothermic reaction can conveniently be used to heat the alkalized solution prior to filtering. However, depending on the specific variables in the process, in order to keep the trisodium phosphate in solution during filtering, it may be necessary to heat the solution prior to or during filtering.

Another important aspect of the present invention is based on the fact that sodium aluminate is very soluble in both hot and cold water; but trisodium phosphate is much less soluble in water at low temperatures than it is at elevated temperatures, and sodium nitrate is much more soluble than trisodium phosphate. FIG. 2 depicts the solubilities of trisodium phosphate and sodium nitrate in water wherein the vertical axis is grams of anhydrous component per 100 grams of water and the horizontal axis is temperature in degrees centigrade. As illustrated, the solubilities of trisodium phosphate (plot 35) in water at 100° C, 30° C and 0° C are, respectively, 108, 20 and 1.5 grams of $Na_3PO_4$ per 100 grams of water and the sodium nitrate solubilities (plot 37) are much higher. When the alkalized solution is cooled, the sodium nitrate and the sodium aluminate remain in solution, whereas substantial proportions of the trisodium phosphate crystallize out at lower temperatures, for example, at a room temperature of about 25° C. Substantially all of the sodium nitrate and sodium aluminate remain in solution at the lower temperature.

The crystallized trisodium phosphate can then be removed from the cooled alkalized solution by a vacuum filter or other suitable techniques indicated at 38 and dried as by a rotary dryer 40 to produce trisodium phosphate crystals. The mother liquor from filter 38 goes to storage at 42 from which it can be recycled at the reaction tank 30 with another batch of rinse acid and caustic soda. The mother liquor generally includes, in solution, sodium nitrate, sodium aluminate, some uncrystallized trisodium phosphate and some excess caustic soda. Although cooling to about room temperature (about 25° C) is preferred for economic reasons, it should be understood that the process can operate effectively over a wide range of cooling temperatures. Of course, the initial phosphate recovery increases with decreasing temperatures, and the particular cooling temperature selected will determine the economics of recycling the mother liquor. Although crystallization by cooling is preferred, crystallization by other techniques might be used, for example, by evaporation or by precipitation.

As will be described hereinafter, after the mother liquor is recycled to the point where it is not longer useful, it can be further processed for waste treatment as indicated by the flow chart to the right of the vertical dashed line. By way of further description, the present invention may be better understood by reference to the following specific example based on laboratory data:

A typical sample of 35% bright dip rinse acid (sp. gr. = 1.26 at 25° C) had the following chemical composition:

|  | grams/liter |
|---|---|
| $H_3PO_4$ | 405 |
| $AlPO_4$ | 87 |
| $HNO_3$ | 10 |
| $H_2O$ (by difference) | 758 |

In accordance with the invention, the chemical reclamation from the bright dip rinse acid was accomplished by the following three-step process:

As the first step, 620 grams of caustic soda were dissolved in 1240 ml. deionized water. One liter of 35% rinse acid was then slowly introduced into the caustic solution with stirring. The reaction can become rather violent with rapid addition. The addition of caustic solution into the rinse acid would cause large precipitation of aluminum during the reaction because the pH of the solution would change gradually from 1 to 13. However, at the end of the reaction, aluminum would dissolve back into the solution. By adding rinse acid to caustic soda, the aluminum stayed in solution throughout the reaction. The reactions are exothermic. With careful control of the rate at which the rinse acid is added, the temperature of the solution can be maintained about 80° C even without heating. The chemical reactions are as follows:

1. $H_3PO_4 + 3NaOH \rightarrow Na_3PO_4 + 3H_2O$
2. $AlPO_4 + 4NaOH \rightarrow Na_3PO_4 + NaAlO_2 + 2H_2O$
3. $HNO_3 + NaOH \rightarrow NaNO_3 + H_2O$.

Stoichiometrically, 617 grams of NaOH can convert one liter of 35% rinse acid into an alkali solution of 795 grams of $Na_3PO_4$, 58.5 grams of $NaAlO_2$ and 13.5 grams of $NaNO_3$. The solution at this point was slightly cloudy due to the formation of some insoluble heavy metal hydroxides resulting from the reaction products of sodium hydroxide and trace quantities of heavy metals originally in the aluminum alloy or in the bath additives.

As a second step, this hot solution was filtered to remove any insoluble impurities and transferred into a crystallizer. The solution was then cooled down to room temperature with gentle stirring to cause the crystallization of a large proportion of the trisodium phosphate. Water or mother liquor could be added during the crystallizing step to reduce the concentration of impurities and facilitate subsequent filtration and handling.

As the third and final step, crystals of trisodium phosphate were separated from the mother liquor through a vacuum filter and further dried in a rotary dryer (below 70° C). In a commercial application, the filtrate can be returned to the system for reprocessing, for example, making up new charges in the alkalizing step or to be used as diluting solution in the crystallization step. The cycle is repeated until the impurities build up in the mother liquor to such an extent that satisfactory crystal crops are not obtained. The final waste liquor can be further cooled down to 0° C or as low as practical to recover additional trisodium phosphate crystals before it is discarded.

The three-cycle batch reprocessing fo the mother liquor gave the following results:

| Input | Cycle I | Cycle II | Cycle III | Total |
|---|---|---|---|---|
| 35% rinse acid, sp.gr.=1.26 at 25° C | 1000ml | 660ml | 660ml | 2320ml |
| Caustic Soda, 100% NaOH | 620g | 410g | 410g | 1440g |
| $H_2O$ (Filtrate) sp.gr.=1.12 at 25° C | 2480g (0) | 400g (2800ml) | 0 (3150ml) | 2880g (0) |
| Output | | | | |
| (Filtrate) sp.gr.=1.12 at 25° C | (2800ml) | (3150ml) | (0) | (0) |
| TSP crystal, $Na_3PO_4 \cdot 12H_2O$ | 1073g | 1031g | 1807g | 3911g |
| Al. content in crystal | 0.08% | 0.12% | 0.18% | |
| waste solution, sp.gr.=1.06 at 25° C | 0 | 0 | 2600ml | 2600ml |
| $P_2O_5$ recovery | 58.24% | 68.79% | 148.57% | 91.49% |

It should be understood that such laboratory testing data have been given by way of illustration and not by way of limitation. To secure a satisfactory recovery of this operation, it is important to avoid using an unnecessarily large amount of water. The quantity of the trisodium phosphate lost through retention in the final mother liquor can be minimized if the smallest possible amount of water is used. However, since trisodium phosphate crystalline melts at a temperature (about 74° C) below the boiling point of water, sufficient water must be used to allow the solution to cool below the melting point of the crystal before the crystal separates out; otherwise a well formed crystal may not be obtained. Crystals obtained from this process are actually hydrate complexes with sodium hydroxide having essentially the formula $(Na_3PO_4.12H_2O) \cdot \frac{1}{4}NaOH$ which is the common form of the present commercial product. Hence it will be understood that the term "trisodium phosphate" as used herein in reference to the end product includes trisodium phosphate complexes. The crystals obtained from the above example contain the impurity, aluminum, varying from 0.08% in the initial process of 0.18% in the third cycle. This is because of incomplete separation of the crystals from the mother liquor containing such dissolved impurity. A more pure end product can be obtained by washing the crystals with a small amount of cold water during the filtration step.

Although the preferred method for reclaiming spent phosphoric acid using caustic soda has been described hereinabove, the present invention also contemplates other methods to make trisodium phosphate from the rinse acid of a bright dip line. For example, it is expected that raw material costs can be reduced by using soda ash ($Na_2CO_3$) in place of a portion of the caustic soda in a manner similar to that conventionally used to make trisodium phosphate from phosphoric acid as previously described. The chemical reactions must be carried out in two stages, first by reaction with soda ash and then by reaction with caustic soda. When the first stage of reactions is completed, the resulting solution is actually a mixture of disodium phosphate, sodium nitrate and a large amount of insoluble aluminum phosphate. This solution should not be filtered because a large quantity of valuable phosphates will be lost in the insolubles. Further addition of sufficient caustic soda will not only convert all the phosphate into trisodium phosphate but also change insoluble aluminum compounds into soluble sodium aluminate. The process is then completed by filtering, cooling, separating and drying along the lines set forth in steps 2 and 3 as described in the example.

Referring again to FIG. 1, it may be required to reduce phosphorus content to 1 mg P/1 before spent mother liquor from filter 38 can be discharged as a plant effluent. The spent mother liquor from the above reclamation process contains 2–5% $Na_3PO_4$ depending on the final crystallization temperature. However, the phosphorus can be easily and efficiently removed from this waste solution since sodium aluminate which is highly present in the solution is a most efficient coagulant for phosphorus precipitation. Therefore, the spent mother liquor from filter 38 can be periodically fed to a neutralization tank 50 to which sulfuric acid 52 is added to lower the pH in the range of 6 to 9. During this neutralization, phosphate is precipitated in the form of aluminum hydroxy phosphate or other complex. The chemical reactions may be represented as follows:

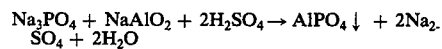

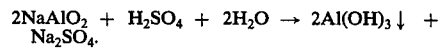

Insolubles are removed by filtration at 54 so that an effluent with a minimum phosphorus content is obtained.

Although the present invention has been described in connection with reclamation of phosphate from an aluminum bright dip operation and indeed one of the principal objects of the present invention is to reduce the expense and waste in such an operation, it will be apparent that the present invention is potentially useful in making trisodium phosphate with phosphoric acids from sources other than a bright dip operation where the phosphoric acid has a high aluminum content. Hence as indicated earlier, an important feature of the present invention is to maximize the phosphoric acid that is converted to trisodium phosphate and minimize the loss of phosphate combining with the aluminum. If wet phosphoric acid is made from phosphate rock with high aluminum content, the present invention may be potentially useful in removing the phosphoric acid free from the aluminum impurity to make trisodium phosphate.

The present invention is also potentially useful in recovering phosphate from other spent phosphoric acid present in other aluminum finishing operations, for example, from spent phosphoric acid anodizing solutions, although such anodizing is not believed to be commercially used at the present time.

Based on current market prices, the present invention produces trisodium phosphate at a cost lower than that produced by conventional methods. Just as importantly, bright dipping costs are reduced significantly. Other less apparent but important advantages are also realized. With effective phosphate recovery from the rinse acid according to the present invention, other operating parameters of the bright dip line can be selected to further reduce the overall operating cost. For example, with a three-stage countercurrent rinse, the first stage is typically operated above 30% concentration so that the rinse acid could be sold to the fertilizer industry. However, at these concentrations, there will be a certain loss to subsequent rinses. Since the present invention does not necessarily require such a high concentration, particularly where performed on site, the first rinse stage could be operated at a concentration below 30%, thus reducing the loss to later rinsing stages. This in turn not only results in higher recovery but also reduces waste treatment costs. Another potential saving can be realized because with high phosphate recovery according to the present invention, the bright dip bath may be operated more economically without regard to drag-out, for example, by operating the bright dip bath at lower temperatures, i.e., at the lower end of the accepted temperature range of about 90° C to 120° C. Although this results in an increase in solution drag-out, it reduces the energy required to heat the bath.

It will be appreciated that the present invention can be practiced effectively either on site or by transporting the rinse acid to a central location serving several plants. In the latter case, 35% $H_3PO_4$ rinse acid would be the most desirable concentration.

It will be understood that the method of reclaiming phosphate from bright dip drag-out has been described hereinabove for purposes of illustration and is not intended to indicate limits of the present invention, the scope of which is defined by the following claims.

I claim:

1. The method of recovering phosphate values from waste aqueous acid solutions generated in aluminum bright dip operations of the type containing phosphoric acid in combination with appreciable amounts of dissolved aluminum phosphate and nitric acid which comprises the steps of reacting said waste aqueous acid solution with an alkali material selected from the group consisting of sodium hydroxide and a combination of sodium hydroxide and sodium carbonate in a manner to convert substantially all of the aluminum phosphate to sodium aluminate and trisodium phosphate, said nitrc acid to sodium nitrate, and substantially all of said phosphoric acid to trisodium phosphate; said sodium aluminate, sodium nitrate and trisodium phosphate present in the form of dissolved salts in the liquid aqueous reaction solution, removing a portion of said trisodium phosphate from said aqueous reaction solution by crystallization while retaining said sodium aluminate and said sodium nitrate in the form of solubilized salts in the remaining mother liquor, and thereafter separating the crystallized trisodium phosphate from said mother liquor.

2. The method as defined in claim 1, in which the step of reacting said waste aqueous acid solution with said alkali material is performed at an elevated temperature.

3. The method as defined in claim 2, wherein said elevated temperature is above about 80° C.

4. The method as define in claim 1, including the further step of filtering said liquid aqueous reaction solution to remove insoluble impurities therein before the step of removing a portion of said trisodium phosphate from said solution by crystallization.

5. The method as defined in claim 1, wherein the step of reacting said waste aqueous acid solution with said alkali material is performed in a manner to provide a pH of the reaction solution above about 13.

6. The method as defined in claim 1, wherein the step of reacting said waste aqueous acid solution with said alkali material is performed to provide a stoichiometric excess of sodium ions in the reaction solution.

7. The method as defined in claim 1, wherein the step of reacting said waste aqueous acid solution is performed by progressively introducing said waste aqueous acid solution into an aqueous alkali solution containing sodium hydroxide in a manner to maintain the aluminum constituent dissolved throughout the reaction.

8. The method as defined in claim 1, wherein at least a portion of said mother liquor is recycled.

9. The method as defined in claim 4, wherein the step of filtering said aqueous reaction solution is performed with said aqueous reaction solution at an elevated temperature sufficient to maintain said trisodium phosphate therein in a dissolved state.

10. The method as defined in claim 1, wherein at least a portion of said mother liquor is subjected to further treatment to extract additional trisodium phosphate by crystallization.

11. The method as defined in claim 10, in which the further treatment of the portion of said mother liquor includes super-cooling said mother liquor to a temperature of about 0° C to effect further crystallization of the dissolved trisodium phosphate therein.

12. The method as defined in claim 10, in which the portion of said mother liquor after further treatment to extract additional trisodium phosphate bycrystallization is thereafter subjected to further waste treatment by neutralizing with an acid to a pH in the range of about 6 to about 9 to effect a precipitation of substantially all of the remaining phosphate values therein whereafter the neutralized solution is filtered and the filtrate harmlessly discharged to waste.

* * * * *